US012812186B2

(12) United States Patent
Wang et al.

(10) Patent No.: US 12,812,186 B2
(45) Date of Patent: Nov. 24, 2026

(54) CONTENT GENERATION METHOD, READABLE MEDIUM, AND ELECTRONIC DEVICE

(71) Applicant: Beijing Youzhuju Network Technology Co., Ltd., Beijing (CN)

(72) Inventors: Xiao Wang, Beijing (CN); Hui Wang, Beijing (CN); Yingying Li, Beijing (CN); Jinhui Qian, Beijing (CN); Wen Zhou, Beijing (CN); Wubo Cai, Beijing (CN); Rong Zhao, Beijing (CN); Kun Bi, Beijing (CN); Tianjing Zhong, Beijing (CN); Haixu Zhai, Beijing (CN); Hui Liao, Beijing (CN); Lang Gong, Beijing (CN); Xiaojie Wang, Beijing (CN); Xue Wang, Beijing (CN); Jiguang Wu, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/019,064

(22) Filed: Jan. 13, 2025

(65) Prior Publication Data

US 2025/0234052 A1 Jul. 17, 2025

(30) Foreign Application Priority Data

Jan. 12, 2024 (CN) ........................ 202410053598.4

(51) Int. Cl.
*H04N 21/254* (2011.01)
*H04N 21/2187* (2011.01)

(52) U.S. Cl.
CPC ..... *H04N 21/2187* (2013.01); *H04N 21/2542* (2013.01)

(58) Field of Classification Search
CPC ........................ H04N 21/2187; H04N 21/2542
See application file for complete search history.

(56) References Cited

U.S. PATENT DOCUMENTS

2024/0078385 A1* 3/2024 Liang ...................... G06F 40/30
2024/0340468 A1* 10/2024 Zhou .................. H04N 21/4316

FOREIGN PATENT DOCUMENTS

CN 112883725 A 6/2021
CN 112989205 A 6/2021
(Continued)

OTHER PUBLICATIONS

Anitha, R. et al., "NextGen Dynamic Video Generator using AI," Proceedings of the 2023 9th International Conference on Smart Structures and Systems (ICSSS) , Nov. 23, 2023, Chennai, India, 8 pages.

(Continued)

*Primary Examiner* — Yassin Alata
(74) *Attorney, Agent, or Firm* — Alleman Hall LLP

(57) ABSTRACT

The present disclosure relates to a content generation method, a readable medium and an electronic device. The content generation method includes: displaying a content generation page, where the content generation page is used to generate textual content required for live-streaming; and displaying, in response to target information of a target object that is entered in the content generation page, live-streaming textual content that is for the target object and generated based on the target information, in which the live-streaming textual content is used to introduce the target object in a live-streaming manner.

19 Claims, 5 Drawing Sheets

(56) References Cited

FOREIGN PATENT DOCUMENTS

| | | | | | | |
|---|---|---|---|---|---|---|
| CN | 113382308 | A | | 9/2021 | | |
| CN | 115496550 | A | | 12/2022 | | |
| CN | 116264603 | A | * | 6/2023 | ......... | H04N 21/4788 |

OTHER PUBLICATIONS

Avignone, A. et al., "Generation of Textual/Video Descriptions for Technological Products Based on Structured Data," Proceedings of the 2023 IEEE 17th International Conference on Application of Information and Communication Technologies (AICT2023) , Oct. 18, 2023, Baku, Azerbaijan, 7 pages.
European Patent Office, Extended European Search Report Issued in Application No. 25151383.4, Mar. 20, 2025, 12 pages.
Guo, Z. et al., "TaoHighlight: Commodity-Aware Multi-Modal Video Highlight Detection in E-Commerce," IEEE Transactions on Multimedia, vol. 24, 2022, 11 pages.
Liu, K. et al., "Intelligent design of multimedia content in Alibaba," Frontiers of Information Technology & Electronic Engineering, vol. 20, Issue 12, Feb. 13, 2020, 8 pages.

* cited by examiner

CONTENT GENERATION METHOD, READABLE MEDIUM, AND ELECTRONIC DEVICE

CROSS-REFERENCE TO RELATED APPLICATION

The present application claims the priority to and benefits of the Chinese Patent Application No. 202410053598.4, filed on Jan. 12, 2024, the disclosure of which is incorporated herein by reference in its entirety as part of the present application.

TECHNICAL FIELD

The present disclosure relates to a content generation method, a readable medium and an electronic device.

BACKGROUND

Live-streaming is a popular and mainstream media genre and dissemination manner at present. Before and during a live-streaming, a live-streaming host needs to prepare for live-streaming content and optimize expressions during the live-streaming by writing and referring to a live-streaming text, to achieve better live-streaming performance.

The live-streaming text is usually written manually, which is time-consuming and inefficient. Moreover, the writer needs to have an ability to write the live-streaming text, making the difficulty in writing high.

SUMMARY

The present invention content is provided to introduce concepts in a simplified form, which are described in detail in the following specific embodiments. The present invention content is not intended to identify key features or essential features of the claimed technical solutions, nor is it intended to be used to limit the scope of the claimed technical solutions.

The present disclosure provides a content generation method. The content generation method includes: displaying a content generation page, in which the content generation page is used to generate textual content required for live-streaming; and displaying, in response to target information of a target object that is entered in the content generation page, live-streaming textual content that is for the target object and generated based on the target information, in which the live-streaming textual content is used to introduce the target object in a live-streaming manner.

The present disclosure provides a content generation apparatus. The content generation apparatus includes a page display module and a content display module. The page display module is configured to display a content generation page, in which the content generation page is used to generate textual content required for live-streaming. The content display module is configured to, in response to target information of a target object that is entered in the content generation page, display live-streaming textual content that is for the target object and generated based on the target information, in which the live-streaming textual content is used to introduce the target object in a live-streaming manner.

The present disclosure provides a computer-readable medium. A computer program is stored on the computer-readable medium. When the program is executed by a processor, the processor implements steps of the content generation method.

The present disclosure provides an electronic device, which includes a memory and a processor. The memory is configured to store a computer program; and the processor is configured to execute the computer program in the memory to implement steps of the content generation method.

BRIEF DESCRIPTION OF DRAWINGS

The above and other features, advantages, and aspects of embodiments of the present disclosure become more apparent with reference to the following specific embodiments and in conjunction with the accompanying drawings. Throughout the drawings, the same or similar reference numerals denote the same or similar elements. It should be understood that the accompanying drawings are schematic and that parts and elements are not necessarily drawn to scale. In the drawings.

DETAILED DESCRIPTION

Figure 1:
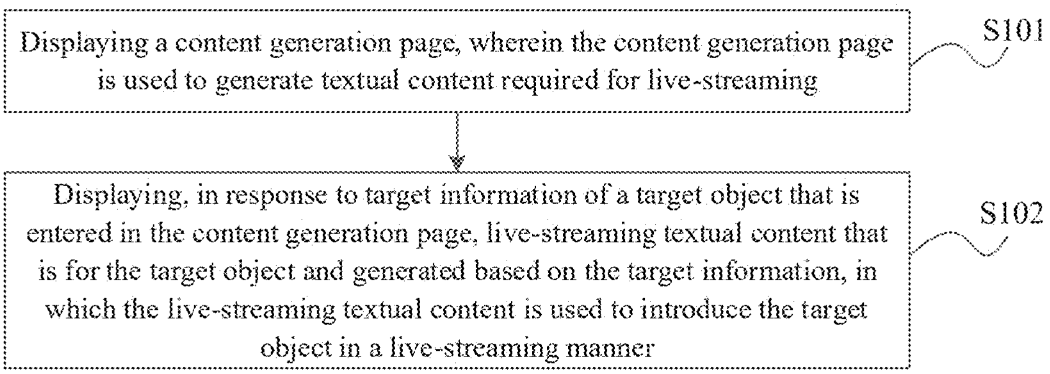
FIG. 1 is a schematic flowchart of a content generation method according to an exemplary embodiment.

Embodiments of the present disclosure are described in more detail below with reference to the accompanying drawings. Although some embodiments of the present disclosure are shown in the drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for exemplary purposes, and are not intended to limit the scope of protection of the present disclosure.

It should be understood that the various steps described in the method implementations of the present disclosure may be performed in different orders, and/or performed in parallel. Furthermore, additional steps may be included and/or the execution of the illustrated steps may be omitted in the method implementations. The scope of the present disclosure is not limited in this respect.

The terms “include/comprise” used herein and the variations thereof are an open-ended inclusion, namely, “include/comprise but not limited to”. The term “based on” is “at least partially based on”. The term “an embodiment” means “at least one embodiment”; the term “another embodiment” means “at least one another embodiment”; and the term “some embodiments” means “at least some embodiments”. Related definitions of other terms will be given in the description below.

It should be noted that concepts such as “first” and “second” mentioned in the present disclosure are only used to distinguish different apparatuses, modules, or units, and are not used to limit the sequence of functions performed by these apparatuses, modules, or units or the interdependence relationship.

It should be noted that the modifiers “one” and “a plurality of” mentioned in the present disclosure are illustrative and not restrictive, and those skilled in the art should understand that unless the context clearly indicates otherwise, the modifiers should be understood as “one or more”.

Names of messages or information exchanged between a plurality of apparatuses in the implementations of the present disclosure are used for illustrative purposes only, and are not used to limit the scope of these messages or information.

It may be understood that before using the technical solutions disclosed in the embodiments of the present disclosure, the types, scope of use, and usage scenarios of personal information involved in the present disclosure shall be informed to the users and the users’ authorization shall be obtained in an appropriate manner in accordance with the relevant laws and regulations.

For example, when receiving an active request from a user, prompt information is sent to the user to explicitly prompt the user that the operation requested by the user will need to acquire and use the user’s personal information. Therefore, the user can independently choose whether to provide personal information to software or hardware such as an electronic device, an application, a server, or a storage medium that executes the operation of the technical solution of the present disclosure based on the prompt information.

As an optional but non-limiting implementation, for example, a manner of sending prompt information to the user in response to receiving the active request from the user may be a pop-up window, and the prompt information may be presented in the pop-up window in a text manner. In addition, the pop-up window may also carry a selection control for the user to select “Agree” or “Disagree” to provide personal information to the electronic device.

It may be understood that the above process of notifying and obtaining the user’s authorization is only illustrative, and does not limit the implementation of the present disclosure. Other manners that comply with relevant laws and regulations may also be applied to the implementation of the present disclosure.

In addition, it may be understood that the data involved in the technical solutions (including but not limited to the data itself, the acquisition or use of the data) shall comply with the requirements of corresponding laws and regulations and relevant provisions.

Live-streaming is a popular and mainstream media genre and dissemination manner at present. Before and during a live-streaming, a live-streaming host needs to prepare for live-streaming content and optimize expressions during the live-streaming by writing and referring to a live-streaming text (live-streaming script content), to achieve better live-streaming performance.

Taking the commodity live-streaming as an example, explanations on commodity features and sales promotions are required, and an expression style shall be close to the live-streaming genre and integrate popular expression manners on the Internet and the like. Compared with offline sales, online live-streaming has the characteristics of information-intensive, continuous output, vivid display, and instant interaction, and the live-streaming host needs to specially learn and train the expression ability to complete the live-streaming. In addition, the live-streaming host needs to have an in-depth understanding of the features of the commodities, know how to highlight the advantages of the commodities, have an excellent shopping guide ability, and work closely with the merchants, to complete the commodity live-streaming.

For example, the AI (Artificial Intelligence) text generation capability may be used to describe a video requirement, and an AI generates script words required in a video, for example, a shooting script including contents such as a scene, a camera movement, and character dialogue content, which is generally used for text matching or voiceover matching in shooting, editing, and generation of a short video. Alternatively, the AI text generation capability is used to describe a marketing requirement, and an AI generates contents such as commodity recommendations and usage evaluations written by a user for simulation, to be posted on a social platform, or the AI generates a plurality of titles with styles of social media, for the user to use for reference. When the foregoing AI generation capability is directly applied to a live-streaming scenario, a live-streaming text that matches the live-streaming style cannot be generated because information such as commodity features or sales promotions is not combined in the generation process, and therefore the requirement for text generation in the live-streaming scenario cannot be met.

In addition, live-streaming content of a real live-streaming room may be recognized by speech, manually sorted, and the like, to form a live-streaming words inspiration library for the user to use for reference. However, this manner does not have an automatic creation capability, and the user needs to write a live-streaming text with reference to the content of the inspiration library, which is time-consuming and inefficient. In addition, the writer needs to have an ability to write the live-streaming text, making the difficulty in writing high.

In view of the above, the embodiments of the present disclosure provide a content generation method and apparatus, a readable medium and an electronic device, to solve the above technical problems.

The following further describes the embodiments of the present disclosure with reference to the accompanying drawings.

FIG. 1 is a flowchart of a content generation method according to an exemplary embodiment of the present disclosure. Referring to FIG. 1, the content generation method includes the following steps.

S101: displaying a content generation page, wherein the content generation page is used to generate textual content required for live-streaming.

S102: displaying, in response to target information of a target object that is entered in the content generation page, live-streaming textual content that is for the target object and generated based on the target information, in which the live-streaming textual content is used to introduce the target object in a live-streaming manner.

By using the above method, the content generation page is displayed, and in response to the target information of the target object that is entered in the content generation page, the live-streaming textual content that is for the target object and generated based on the target information is displayed. That is, the live-streaming textual content for the target object may be displayed based on the entered target information of the target object, that is, the automatic generation of the live-streaming textual content can be implemented, so that the generation efficiency of the live-streaming texts can be improved, and the difficulty in writing the live-streaming texts can be reduced.

It should be understood that to facilitate the detailed description of the embodiments of the present disclosure, the following uses an application scenario of commodity live-streaming as an example for illustration. The application scenario is only an example, and shall not impose any limitation on the function and scope of use of the embodiments of the present disclosure. That is, in addition to being applied to commodity live-streaming, the content generation method of the present disclosure may also be applied to other live-streaming scenarios that require generation of live-streaming texts.

In a possible manner, the step of displaying, in response to target information of a target object that is entered in the content generation page, live-streaming textual content that is for the target object and generated based on the target information, may include: in response to detail information of the target object that is entered in the content generation page, displaying live-streaming textual content that is for the target object and generated based on the detail information; or in response to identification information of the target object that is entered in the content generation page, displaying the detail information of the target object, and in response to a content generation operation on the content generation page, displaying the live-streaming textual content that is for the target object and generated based on the detail information.

For example, the detail information of the target object may be entered, and then the live-streaming textual content for the target object is generated based on the detail information of the target object. Alternatively, the identification information of the target object may be entered, and the detail information of the target object is determined based on the identification information. Then, the live-streaming textual content for the target object is generated based on the detail information of the target object. The specific implementation may be set based on requirements, which is not limited in the present disclosure.

In a possible manner, the target object is a target commodity object, the detail information includes at least one of a commodity image, a commodity name and commodity attributes of the target commodity object, and the identification information includes a commodity number and/or a commodity link of the target commodity object.

Figure 2:
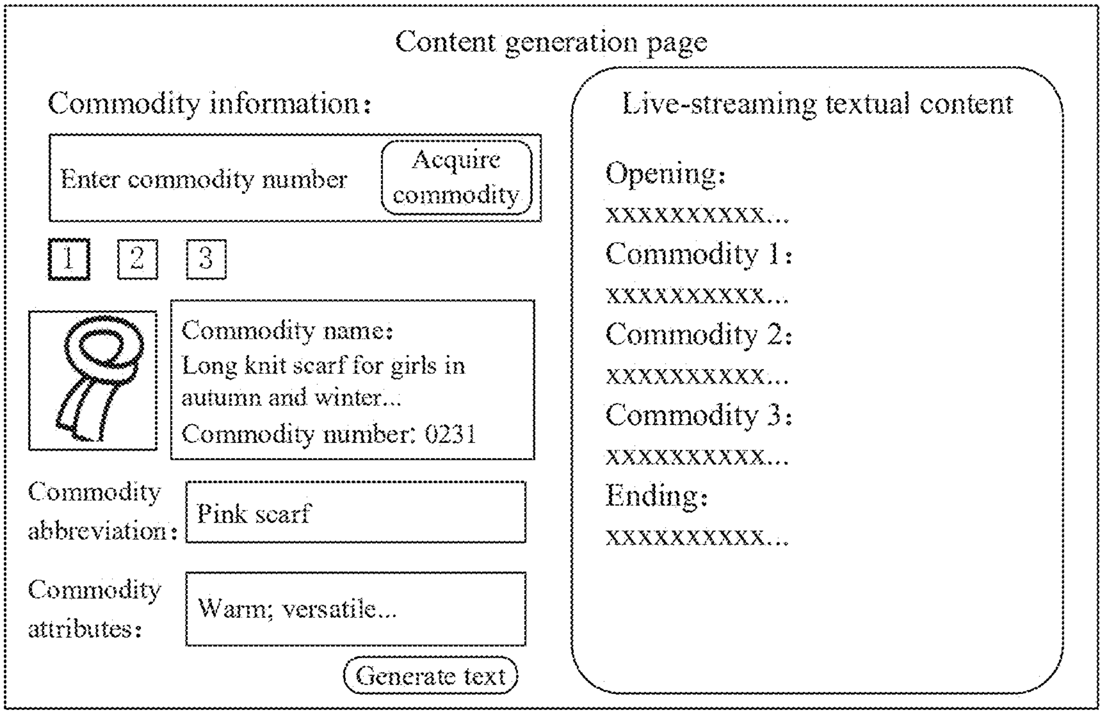
FIG. 2 is a schematic diagram of a content generation page according to an exemplary embodiment.

For example, referring to FIG. 2, the detail information of the target commodity object may be entered. Or the detail information of the target commodity object may be obtained based on the entered commodity number or commodity link, and then displayed on the content generation page, which is not limited in the present disclosure.

It should be understood that the detail information of the target commodity object may be Internet public information used when corresponding usage rules and laws and regulations are met, or a merchant A may acquire the detail information of a commodity posted by an account of the merchant A to generate a live-streaming text, or the merchant A may authorize a live-streaming host B to acquire the detail information of the commodity posted by the account of the merchant A to generate the live-streaming text, which is not limited in the present disclosure.

Referring to FIG. 2 again, in another possible implementation, the detail information of the commodity may be refined. For example, for a commodity with a long commodity name, a commodity abbreviation may be determined to facilitate simplifying the generated live-streaming text. In addition, an edit operation may also be performed on the commodity abbreviation, commodity attributes and other commodity detail information, so as to generate a live-streaming text that better meets the needs of the user.

In a possible manner, the step of displaying, in response to target information of a target object that is entered in the content generation page, live-streaming textual content that is for the target object and generated based on the target information, may include: in response to target information of a plurality of target objects that is entered in the content generation page, displaying live-streaming textual content that is for the plurality of the target objects and generated based on the target information of the plurality of the target objects, in which the live-streaming textual content includes live-streaming textual content of each target object and linking textual content between two adjacent target objects.

For example, referring to FIG. 2 again, a plurality of commodity numbers may be entered, and detail information of the plurality of commodities is displayed, and then the live-streaming textual content for the plurality of target objects is generated. Moreover, linking textual content between the commodities may also be generated. For example, three commodity numbers are entered, and the live-streaming textual content for the three commodities is generated. The live-streaming textual content may include an opening text, live-streaming textual content of a commodity 1, linking textual content between the commodity 1 and a commodity 2, live-streaming textual content of the commodity 2, linking textual content between the commodity 2 and a commodity 3, live-streaming textual content of the commodity 3, and an ending text. That is, a complete live-streaming text is generated, and through the linking textual content between the commodities, it avoids that the text is sudden and stiff, so that the live-streaming introduction is smoother, and the live-streaming effect is improved.

It should be noted that the number of commodities that can be entered at one time may be limited, or may not be limited. In addition, a commodity may be deleted or added, and then a corresponding live-streaming text is generated based on the deleted or added commodity. Alternatively, the sequence of the plurality of commodities may be adjusted, and then a live-streaming text is generated based on the sequence of the plurality of commodities. This is not limited in the present disclosure.

In a possible manner, the step of displaying, in response to target information of a target object that is entered in the content generation page, live-streaming textual content that is for the target object and generated based on the target information, may include: in response to commodity information of a target commodity object and sales rule information for the target commodity object that are entered in the content generation page, displaying live-streaming textual content that is for the target commodity object and generated based on the commodity information and the sales rule information.

Figure 3:
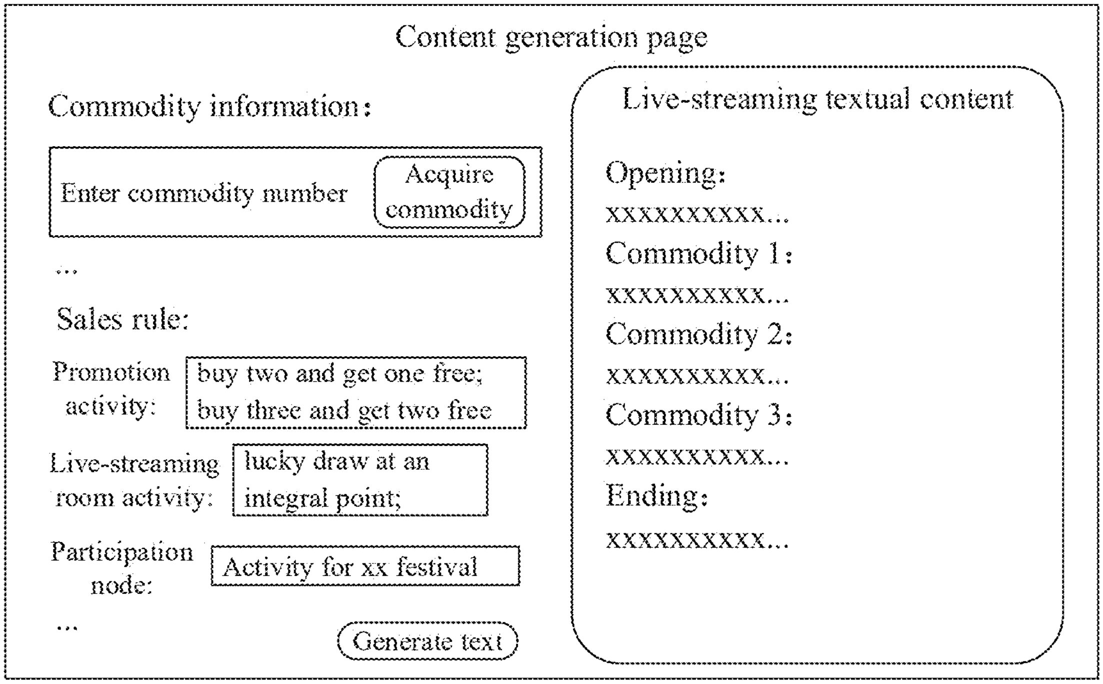
FIG. 3 is a schematic diagram of another content generation page according to an exemplary embodiment.

For example, referring to FIG. 3, the commodity information and the sales rule information of the commodity may be entered in the content generation page, and then the live-streaming textual content may be generated based on the commodity information and the sales rule information of the commodity. In this way, the live-streaming text can be generated in combination with the commodity information and the sales rules, which is suitable for the application scenario of commodity live-streaming.

It should be noted that the commodity information and the sales rule information shown in FIG. 2 and FIG. 3 are only used as examples, and may be specifically set based on requirements, which is not limited in the present disclosure. Moreover, the target information of the target object and the generated live-streaming text may be displayed in different regions of the same page, or the target information may be first entered, and then a generation control is clicked to display the generated live-streaming text on a new page. The specific implementation may be set based on requirements, which is not limited in the present disclosure.

In a possible manner, the content generation method further includes: displaying content structure information when the live-streaming textual content is displayed, in which the content structure information is used to represent a content composition structure of the live-streaming textual content; and in response to a trigger operation on target structure information in the content structure information, marking, in the live-streaming textual content, target textual content corresponding to the target structure information.

Figure 4:
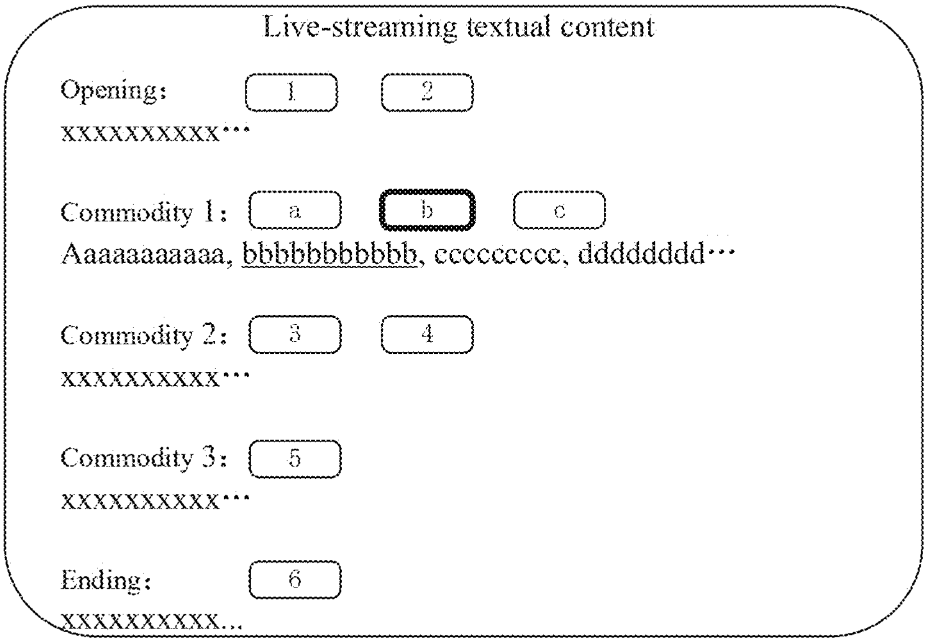
FIG. 4 is a schematic diagram of display structure information of live-streaming textual content according to an exemplary embodiment.

For example, referring to FIG. 4, when the live-streaming textual content is displayed, the content structure information is displayed. For example, the opening text displays content structure information 1 and content structure information 2, indicating that the opening text is formed of textual content corresponding to the content structure information 1 and textual content corresponding to the content structure information 2. The present disclosure does not limit the display position and display style of the content structure information, and specific implementation may be set based on requirements. By presenting the structure of the live-streaming textual content, it is convenient for the user to better understand the live-streaming textual content. In addition, the user can also refer to and learn to create the live-streaming text, and improve the text creation ability.

For example, referring to FIG. 4 again, in response to the trigger operation on the target structure information in the content structure information, for example, the content structure information b is triggered, and the target textual content corresponding to the content structure information b is marked in the live-streaming textual content. The marking may be highlighting, underlining, and the like. This is not limited in the present disclosure, so that the user can understand and learn the live-streaming textual content sentence by sentence.

It should be noted that the content structure information may correspond to all the content in the live-streaming textual content or may correspond to some content. For example, a commodity 1 is formed of textual content A, textual content B, textual content C and textual content D. Then, content structure information a corresponding to the textual content A, content structure information b corresponding to the textual content B, content structure information c corresponding to the textual content C and content structure information d corresponding to the textual content D are displayed. In this way, it is convenient for the user to understand and learn the live-streaming textual content sentence by sentence. Alternatively, structure information corresponding to key content may also be displayed. For example, the textual content A, the textual content B and the textual content C are the key content, and the textual content D is non-key content, then the content structure information a, the content structure information b and the content structure information c are displayed. In this way, it is convenient for the user to pay attention to the key content in the live-streaming textual content. The specific implementation may be set based on requirements, which is not limited in the present disclosure.

In a possible manner, the step of displaying, in response to target information of a target object that is entered in the content generation page, live-streaming textual content that is for the target object and generated based on the target information, may include: in response to the target information of the target object that is entered in the content generation page, displaying first live-streaming textual content that is for the target object and generated based on the target information; and in response to a trigger operation on a regeneration control in the content generation page, displaying second live-streaming textual content that is for the target object and regenerated based on the target information, in which the second live-streaming textual content and the first live-streaming textual content have different content structures and/or expressions.

Figure 5:
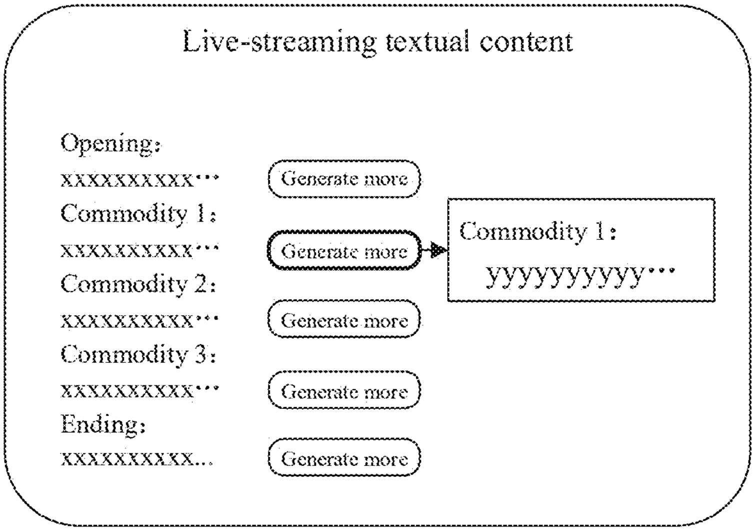
FIG. 5 is a schematic diagram of regenerating live-streaming textual content according to an exemplary embodiment.

For example, referring to FIG. 5, after the first live-streaming textual content for the target object is generated based on the target information of the target object, the second live-streaming textual content for the target object may also be generated by triggering the regeneration control, for example, a "Generate more" control shown in FIG. 5. Moreover, the second live-streaming textual content and the first live-streaming textual content have different content structures and/or expressions. In this way, the live-streaming texts with different content structures and/or expressions are provided for the user to choose, and it is also convenient for the user to learn different live-streaming texts. In addition, the number of times of regenerating the live-streaming text may be limited, or may not be limited. This is not limited in the present disclosure.

For example, when the plurality of target objects exist, in addition to displaying the regeneration control for the live-streaming textual content of each target object, for example, the "Generate more" control shown in FIG. 5, a regeneration control for all the live-streaming textual content may also be displayed. In this way, new live-streaming textual content may be generated for some live-streaming textual content, or new live-streaming textual content may be generated for all the live-streaming textual content. This is not limited in the present disclosure. In addition, new live-streaming textual content may also be generated for an opening text, an ending text, linking textual content, and the like. This is not limited in the present disclosure.

In a possible manner, the content generation method includes: in response to an edit operation on the live-streaming textual content that is triggered in the content generation page, switching the live-streaming textual content displayed in the content generation page from a display mode to an edit mode; and in response to a modification operation on the live-streaming textual content in the edit mode, determining modified textual content corresponding to the modification operation, and in response to a save operation on the modified textual content, displaying the modified textual content on the content generation page by using the display mode.

Figure 6:
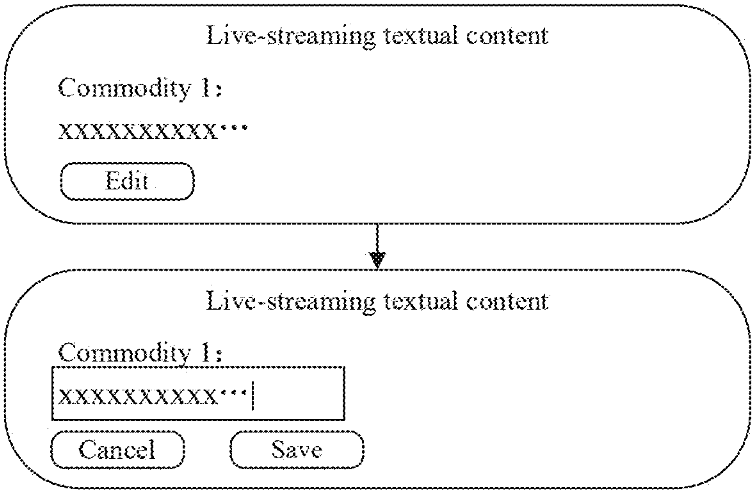
FIG. 6 is a schematic diagram of an edit mode of live-streaming textual content according to an exemplary embodiment.

For example, referring to FIG. 6, by triggering an edit control, the live-streaming textual content displayed on the content generation page may be switched from the display mode to the edit mode. In response to the modification operation on the live-streaming textual content in the edit mode, the modified textual content corresponding to the modification operation is determined. For example, a plurality of paragraphs are combined and condensed, or textual content is added or deleted. In this way, the generated live-streaming text can be adjusted to a live-streaming text that is more suitable for the live-streaming habits and the words style of the user.

Then the modified textual content may be saved, and the modified textual content is displayed on the content generation page by using the display mode.

In a possible manner, the content generation method further includes: when the live-streaming textual content is displayed, marking and prompting target content that does not satisfy a preset rule in the live-streaming textual content.

For example, the preset rule may be a live-streaming platform rule, a commodity sales rule, or another rule. For example, a sensitive word is marked and prompted. The specific implementation may be set based on requirements, which is not limited in the present disclosure. Therefore, the user can be prompted to modify the target content that does not satisfy the preset rule. The present disclosure does not limit the manner of marking and prompting. The marking and prompting may be highlighting, background color prompting, and the like. The specific implementation may be set based on requirements.

In another possible manner, operations such as saving and downloading may be performed on the live-streaming textual content, or the live-streaming textual content may be placed in another document by copying and pasting, so as to connect subsequent live-streaming work and facilitate using during a live-streaming.

Figure 7:
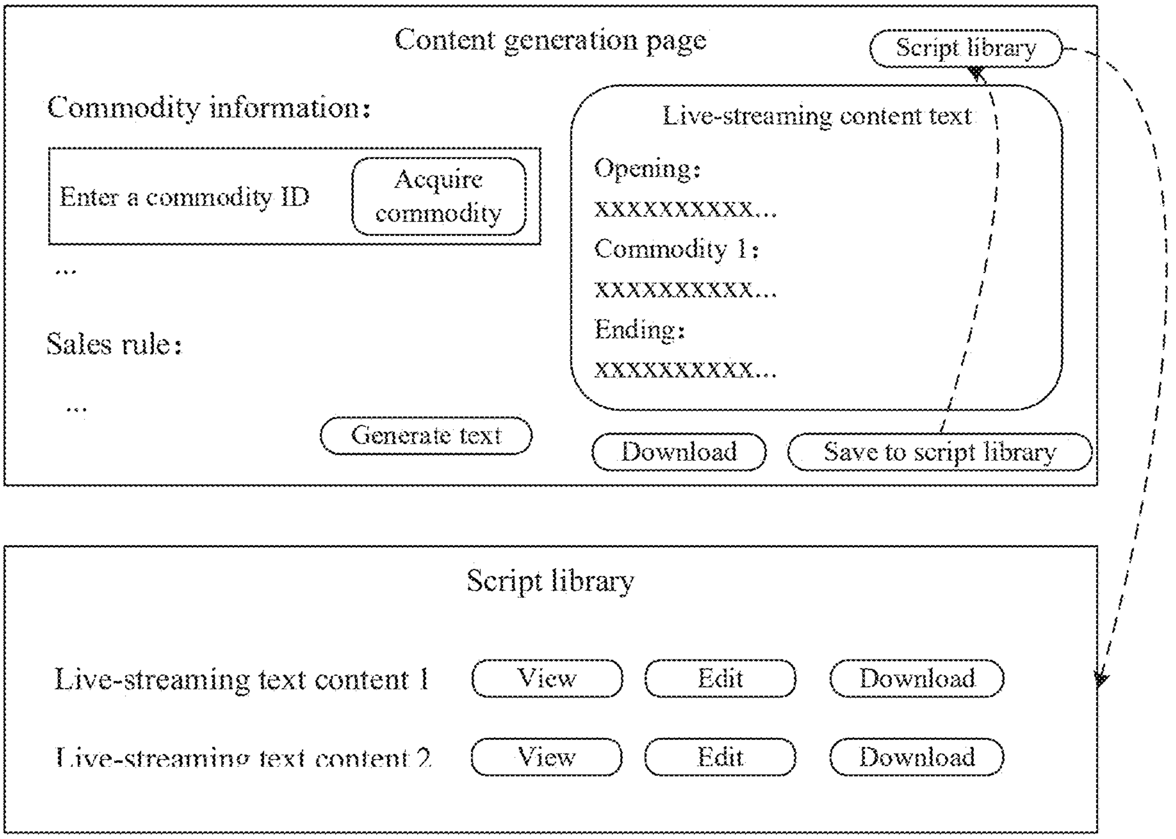
FIG. 7 is a schematic diagram of a script library according to an exemplary embodiment.

For example, referring to FIG. 7, the live-streaming textual content may be saved in a script library, or the live-streaming textual content may be downloaded. On a script library page, the historically saved live-streaming textual content is displayed, and operations such as viewing, editing, and downloading may be performed on the saved live-streaming textual content. The specific implementation may be set based on requirements, which is not limited in the present disclosure.

It should be understood that the target information of the target object may be entered on a terminal device, and then a back-end server generates a live-streaming text based on the target information and returns the live-streaming text to the terminal device for display. Alternatively, the target information of the target object may be entered by using the same electronic device, and then a live-streaming text is generated based on the target information and displayed. This is not limited in the present disclosure.

In a possible manner, the content generation method is applied to the terminal device, and the step of displaying live-streaming textual content that is for the target object and generated based on the target information may include: sending the target information to a server, so that the server obtains the live-streaming textual content for the target object based on the target information and a text generation model, and sends the live-streaming textual content to the terminal device, in which the text generation model is used to generate the textual content required for live-streaming based on input information; and displaying the live-streaming textual content after receiving the live-streaming textual content.

For example, the target information may be sent to the server, and the server generates the live-streaming textual content for the target object based on the target information and the text generation model, and sends the live-streaming textual content to the terminal device for display.

The text generation model may include a live-streaming text template, and is used to generate the live-streaming textual content with a fixed structure based on the input information. The text structure may be obtained by analyzing and refining an existing live-streaming text, and then the text template is determined. Different text templates may be set for different types of objects, so that different live-streaming texts can be generated for different types of objects. This is not limited in the present disclosure.

In a possible manner, the step of sending the target information to a server, so that the server obtains the live-streaming textual content for the target object based on the target information and a text generation model, may include: sending the target information to the server, so that the server inputs the target information into the text generation model, to obtain the live-streaming textual content that is output by the text generation model and for the target object, in which the text generation model is used to generate divergence information related to the target information based on the target information, and generate the live-streaming textual content for the target object based on the target information and the divergence information.

For example, based on the target information, the text generation model may generate the divergence information related to the target information. For example, for a live-streaming text of a scarf, divergence information such as winter and a snowy day may be associated, and then the live-streaming textual content for the target object is generated based on the target information and the divergence information. In this way, not only the text for introducing the target object can be generated, but also the context, the small story, and the like related to the target object can be diverged, to enrich the content of the live-streaming text and avoid a stiff introduction to the target object, which can be suitable for oral descriptions in a live-streaming scenario and the live-streaming style, and increase the information density and the degree of detail of the live-streaming.

Figure 8:
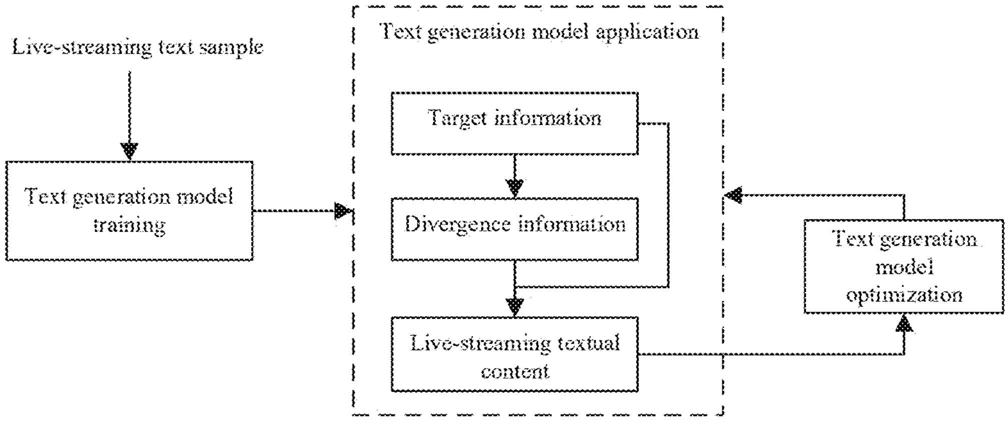
FIG. 8 is a schematic diagram of a training and optimization process of a text generation model according to an exemplary embodiment.

For example, referring to FIG. 8, for the text generation model, the text generation model may be trained by using a live-streaming text sample. In addition, during the use of the text generation model, the text generation model may also be continuously optimized and trained based on the generated live-streaming textual content, for example, optimizing a text structure, a divergence capability and the like. This is not limited in the present disclosure.

By using the above method, the live-streaming text with a live-streaming style can be automatically generated in combination with the entered commodity information, and the features of commodities, shopping guide, and live-streaming are closely combined. In addition, the live-streaming text can be generated for a plurality of commodities and a plurality of paragraphs, and an edit function and a sensitive word prompt function are provided. This not only greatly reduces the generation time of the live-streaming text, improves the generation efficiency of the live-streaming text, and reduces the difficulty in creating the live-streaming text, but also can provide live-streaming text inspiration reference to help the user improve the live-streaming ability.

Figure 9:
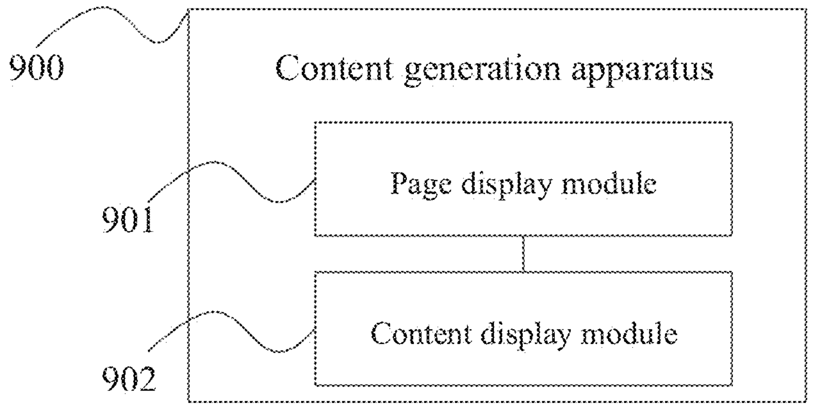
FIG. 9 is a block diagram of a content generation apparatus according to an exemplary embodiment.

Based on the same inventive concept, the present disclosure further provides a content generation apparatus. Referring to FIG. 9, the content generation apparatus 900 includes a page display module 901 and a content display module 902.

The page display module 901 is configured to display a content generation page, in which the content generation page is used to generate textual content required for live-streaming.

The content display module 902 is configured to display, in response to target information of a target object that is entered in the content generation page, live-streaming textual content that is for the target object and generated based on the target information, in which the live-streaming textual content is used to introduce the target object in a live-streaming manner.

By using the above apparatus, the content generation page is displayed, and in response to the target information of the target object that is entered in the content generation page, the live-streaming textual content that is for the target object and generated based on the target information is displayed. That is, the live-streaming textual content for the target object may be displayed based on the entered target information of the target object. By using the method, the live-streaming textual content for the target object may be displayed based on the entered target information of the target object, that is, the automatic generation of the live-streaming textual content can be implemented, so that the generation efficiency of the live-streaming texts can be improved, and the difficulty in writing the live-streaming texts can be reduced.

Optionally, the content generation apparatus 900 further includes a structure display module, and the structure display module is configured to: display content structure information when the live-streaming textual content is displayed, in which the content structure information is used to represent a content composition structure of the live-streaming textual content; and in response to a trigger operation on target structure information in the content structure information, mark, in the live-streaming textual content, target textual content corresponding to the target structure information.

Optionally, the content generation method is applied to the terminal device, and the content display module 902 includes a sending module and a receiving module.

The sending module is configured to send the target information to a server, so that the server obtains the live-streaming textual content for the target object based on the target information and a text generation model, and sends the live-streaming textual content to the terminal device, in which the text generation model is used to generate the textual content required for live-streaming based on input information.

The receiving module is configured to display the live-streaming textual content after receiving the live-streaming textual content.

Optionally, the sending module is configured to send the target information to the server, so that the server inputs the target information into the text generation model, to obtain the live-streaming textual content that is output by the text generation model and for the target object, in which the text generation model is used to generate divergence information related to the target information based on the target information, and generate the live-streaming textual content for the target object based on the target information and the divergence information.

Optionally, the content display module 902 is configured to:

in response to detail information of the target object that is entered in the content generation page, display the live-streaming textual content that is for the target object and generated based on the detail information; or in response to identification information of the target object that is entered in the content generation page, display the detail information of the target object, and in response to a content generation operation on the content generation page, display the live-streaming textual content that is for the target object and generated based on the detail information.

Optionally, the target object is a target commodity object, the detail information includes at least one of a commodity image, a commodity name, and commodity attributes of the target commodity object, and the identification information includes a commodity number and/or a commodity link of the target commodity object.

Optionally, the content display module 902 is configured to:

in response to commodity information of a target commodity object and sales rule information for the target commodity object that are entered in the content generation page, display the live-streaming textual content that is for the target commodity object and generated based on the commodity information and the sales rule information.

Optionally, the content display module 902 is configured to:

in response to target information of a plurality of target objects that is entered in the content generation page, display live-streaming textual content that is for the plurality of the target objects and generated based on the target information of the plurality of the target objects, in which the live-streaming textual content includes live-streaming textual content of each target object and linking textual content between two adjacent target objects.

Optionally, the content display module 902 is configured to:

in response to the target information of the target object that is entered in the content generation page, display first live-streaming textual content that is for the target object and generated based on the target information; and in response to a trigger operation on a regeneration control in the content generation page, display second live-streaming textual content that is for the target object and regenerated based on the target information, in which the second live-streaming textual content and the first live-streaming textual content have different content structures and/or expressions.

Optionally, the content generation apparatus 900 includes an edit module, and the edit module is configured to:

in response to an edit operation on the live-streaming textual content that is triggered in the content generation page, switch the live-streaming textual content displayed in the content generation page from a display mode to an edit mode; and in response to a modification operation on the live-streaming textual content in the edit mode, determine modified textual content corresponding to the modification operation, and in response to a save operation on the modified textual content, display the modified textual content on the content generation page by using the display mode.

Optionally, the content generation apparatus 900 includes a prompt module, and the prompt module is configured to:

when the live-streaming textual content is displayed, mark and prompt target content that does not satisfy a preset rule in the live-streaming textual content.

For the apparatus in the above embodiments, the specific manner in which each module performs an operation has been described in detail in the embodiments related to the method, and will not be described in detail here.

Based on the same inventive concept, an embodiment of the present disclosure further provides a computer-readable medium, having a computer program stored thereon, where when the program is executed by a processor, the steps of the content generation method described above are implemented.

Based on the same inventive concept, an embodiment of the present disclosure further provides an electronic device, which includes a memory and a processor.

The memory is configured to store a computer program.

The processor is configured to execute the computer program in the memory to implement the steps of the content generation method described above.

Figure 10:
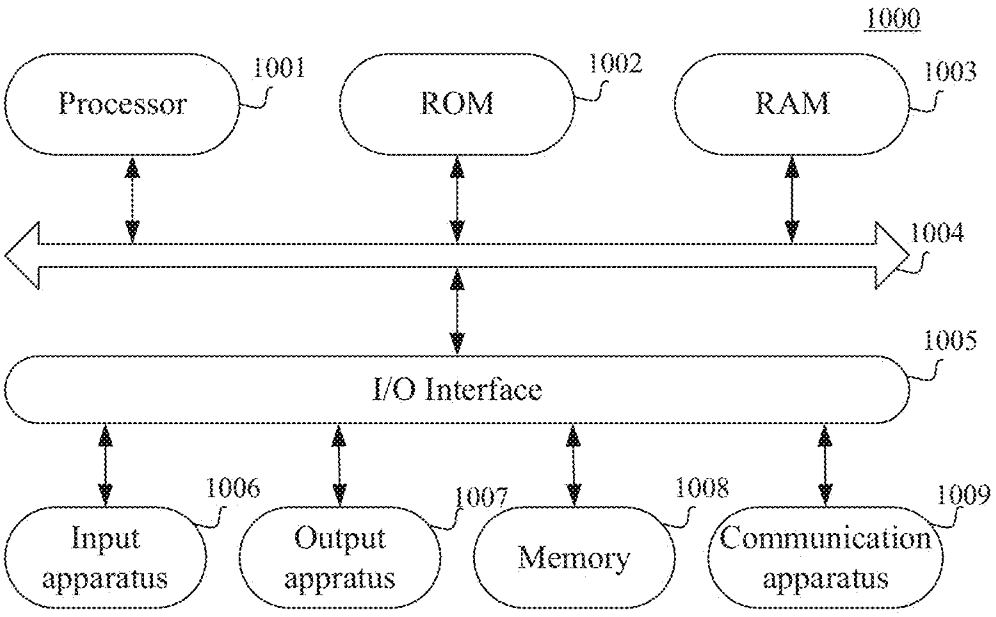
FIG. 10 is a block diagram of an electronic device according to an exemplary embodiment.

FIG. 10 is a schematic diagram of a structure of an electronic device (for example, a terminal device or a server) 1000 suitable for implementing the embodiments of the present disclosure. The terminal device in this embodiment of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (such as a vehicle navigation terminal), and fixed terminals such as a digital TV and a desktop computer. The electronic device shown in FIG. 10 is merely an example, and shall not impose any limitation on the function and scope of use of the embodiments of the present disclosure.

As shown in FIG. 10, the electronic device 1000 may include a processor (for example, a central processor, a graphics processor, etc.) 1001 that may perform a variety of appropriate actions and processing in accordance with a program stored in a read-only memory (ROM) 1002 or a program loaded from a memory 1008 into a random access memory (RAM) 1003. The RAM 1003 further stores various programs and data required for the operation of the electronic device 1000. The processor 1001, the ROM 1002, and the RAM 1003 are connected to each other through a bus 1004. An input/output (I/O) interface 1005 is also connected to the bus 1004.

Generally, the following apparatuses may be connected to the I/O interface 1005: an input apparatus 1006 including, for example, a touchscreen, a touchpad, a keyboard, a mouse, a camera, a microphone, an accelerometer, and a gyroscope; an output apparatus 1007 including, for example, a liquid crystal display (LCD), a speaker, and a vibrator; a memory 1008 including, for example, a tape and a hard disk; and a communication apparatus 1009. The communication apparatus 1009 may allow the electronic device 1000 to perform wireless or wired communication with other devices to exchange data. Although FIG. 10 shows the electronic device 1000 having various apparatuses, it should be understood that it is not required to implement or have all of the shown apparatuses. It may be an alternative to implement or have more or fewer apparatuses.

In particular, according to an embodiment of the present disclosure, the process described above with reference to the flowcharts may be implemented as a computer software program. For example, this embodiment of the present disclosure includes a computer program product, which includes a computer program carried on a non-transitory computer-readable medium, where the computer program includes program code for performing the method shown in the flowchart. In such an embodiment, the computer program may be downloaded from a network through the communication apparatus 1009 and installed, or installed from the memory 1008, or installed from the ROM 1002. When the computer program is executed by the processor 1001, the above-mentioned functions defined in the method of the embodiment of the present disclosure are performed.

It should be noted that the above-mentioned computer-readable medium in the present disclosure may be a computer-readable signal medium, or a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), and the like, or any suitable combination thereof.

In some implementations, communication may be performed using any currently known or future-developed network protocol such as a hypertext transfer protocol (HTTP), and may be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs that, when executed by the electronic device, cause the electronic device to: display a content generation page, where the content generation page is used to generate textual content required for live-streaming; and display, in response to target information of a target object that is entered in the content generation page, live-streaming textual content that is for the target object and generated based on the target information, where the live-streaming textual content is used to introduce the target object in a live-streaming manner.

The computer program code for performing operations in the present disclosure may be written in one or more programming languages or a combination thereof, where the programming languages include but are not limited to an object-oriented programming language, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the circumstance involving the remote computer, the remote computer may be connected to the computer of the user through any type of network, including a local area network (LAN) or a wide area network (WAN), or may be connected to an external computer (for example, connected over the Internet through an Internet service provider).

The flowcharts and block diagrams in the accompanying drawings illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession may actually be executed substantially in parallel, or they may sometimes be executed in a reverse order, depending on a function involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The modules described in the embodiments of the present disclosure may be implemented by software, or may be implemented by hardware. The name of a module does not constitute a limitation on the module itself in some cases.

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination of the foregoing. A more specific example of a machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

The above descriptions are merely preferred embodiments of the present disclosure and explanations of the applied technical principles. A person skilled in the art should understand that the scope of disclosure involved in the present disclosure is not limited to the technical solution formed by the specific combination of the above technical features, and shall also cover other technical solutions formed by any combination of the above technical features or equivalent features thereof without departing from the above concept of disclosure. For example, a technical solution formed by replacing the above features with technical features with similar functions disclosed in the present disclosure (but not limited thereto).

In addition, although the various operations are depicted in a specific order, it should be understood as requiring these operations to be performed in the specific order shown or in a sequential order. Under specific circumstances, multitasking and parallel processing may be advantageous. Similarly, although several specific implementation details are included in the foregoing discussions, these details should not be construed as limiting the scope of the present disclosure. Some features that are described in the context of separate embodiments may also be implemented in combination in a single embodiment. In contrast, various features described in the context of a single embodiment may also be implemented in a plurality of embodiments individually or in any suitable sub-combination.

Although the subject matter has been described in language specific to structural features and/or logical actions of the method, it should be understood that the subject matter specified in the appended claims is not necessarily limited to the specific features or actions described above. On the contrary, the specific features and actions described above are merely example forms of implementing the claims. For the apparatus in the above embodiments, the specific manner in which each module performs an operation has been described in detail in the embodiments related to the method, and will not be described in detail here.

The invention claimed is:

1. A content generation method, comprising:

displaying a content generation page, wherein the content generation page is configured to generate textual content required for live-streaming; and displaying, in response to first information of a first object that is entered in the content generation page, live-streaming textual content that is for the first object and generated based on the first information, wherein the live-streaming textual content is configured to introduce the first object in a live-streaming manner;

wherein the method further comprises:

displaying content structure information when the live-streaming textual content is displayed, wherein the content structure information represents a content composition structure of the live-streaming textual content, the content structure information comprises at least one piece of structure information, each structure information has corresponding textual content, the live-streaming textual content comprises textual content corresponding to the at least one piece of structure information; and in response to a trigger operation on first structure information in the content structure information, marking, in the live-streaming textual content, first textual content corresponding to the first structure information.

2. The content generation method according to claim 1, wherein the content generation method is applied to a terminal device, and the displaying live-streaming textual content that is for the first object and generated based on the first information comprises:

sending the first information to a server, so that the server obtains the live-streaming textual content for the first object based on the first information and a text generation model, and sends the live-streaming textual content to the terminal device, wherein the text generation model is configured to generate the textual content required for live-streaming based on input information; and displaying the live-streaming textual content after receiving the live-streaming textual content.

3. The content generation method according to claim 2, wherein the sending the first information to a server, so that the server obtains the live-streaming textual content for the first object based on the first information and a text generation model comprises:

sending the first information to the server, so that the server inputs the first information into the text generation model, to obtain live-streaming textual content that is output by the text generation model and for the first object, wherein the text generation model is configured to generate divergence information related to the first information based on the first information, and generate the live-streaming textual content for the first object based on the first information and the divergence information.

4. The content generation method according to claim 1, wherein the displaying, in response to first information of a first object that is entered in the content generation page, live-streaming textual content that is for the first object and generated based on the first information, comprises:

in response to detail information of the first object that is entered in the content generation page, displaying live-streaming textual content that is for the first object and generated based on the detail information; or in response to identification information of the first object that is entered in the content generation page, displaying the detail information of the first object, and in response to a content generation operation on the content generation page, displaying the live-streaming textual content that is for the first object and generated based on the detail information.

5. The content generation method according to claim 4, wherein the first object is a commodity object, the detail information comprises at least one of a commodity image, a commodity name, and commodity attributes of the commodity object, and the identification information comprises at least one of a commodity number or a commodity link of the commodity object.

6. The content generation method according to claim 1, wherein the first object comprises a commodity object, the displaying, in response to first information of a first object that is entered in the content generation page, live-streaming textual content that is for the first object and generated based on the first information, comprises:

in response to commodity information of the commodity object and sales rule information for the commodity object that are entered in the content generation page, displaying live-streaming textual content that is for the commodity object and generated based on the commodity information and the sales rule information.

7. The content generation method according to claim 1, wherein the displaying, in response to first information of a first object that is entered in the content generation page, live-streaming textual content that is for the first object and generated based on the first information, comprises:

in response to first information of a plurality of first objects that is entered in the content generation page, displaying live-streaming textual content that is for the plurality of first objects and generated based on the first information of the plurality of first objects, wherein the live-streaming textual content comprises live-streaming textual content of each first object and linking textual content between two adjacent first objects.

8. The content generation method according to claim 1, wherein the displaying, in response to first information of a first object that is entered in the content generation page, live-streaming textual content that is for the first object and generated based on the first information, comprises:

in response to the first information of the first object that is entered in the content generation page, displaying first live-streaming textual content that is for the first object and generated based on the first information; and in response to a trigger operation on a regeneration control in the content generation page, displaying second live-streaming textual content that is for the first object and regenerated based on the first information, wherein the second live-streaming textual content and the first live-streaming textual content differ in at least one of content structure or expression.

9. The content generation method according to claim 1, further comprising: in response to an edit operation on the live-streaming textual content that is triggered in the content generation page, switching the live-streaming textual content displayed in the content generation page from a display mode to an edit mode; and in response to a modification operation on the live-streaming textual content in the edit mode, determining modified textual content corresponding to the modification operation, and in response to a save operation on the modified textual content, displaying the modified textual content on the content generation page by using the display mode.

10. The content generation method according to claim 1, further comprising:

when the live-streaming textual content is displayed, marking and prompting first content that does not satisfy a preset rule in the live-streaming textual content.

11. A non-transitory computer-readable medium, wherein a computer program is stored on the non-transitory computer-readable medium, when the program is executed by a processor, the processor implements a content generation method, and the content generation method comprises:

displaying a content generation page, wherein the content generation page is configured to generate textual content required for live-streaming; and displaying, in response to first information of a first object that is entered in the content generation page, live-streaming textual content that is for the first object and generated based on the first information, wherein the live-streaming textual content is configured to introduce the first object in a live-streaming manner;

wherein the method further comprises:

displaying content structure information when the live-streaming textual content is displayed, wherein the content structure information represents a content composition structure of the live-streaming textual content, the content structure information comprises at least one piece of structure information, each structure information has corresponding textual content, the live-streaming textual content comprises textual content corresponding to the at least one piece of structure information; and in response to a trigger operation on first structure information in the content structure information, marking, in the live-streaming textual content, first textual content corresponding to the first structure information.

12. The non-transitory computer-readable medium according to claim 11, wherein the displaying, in response to first information of a first object that is entered in the content generation page, live-streaming textual content that is for the first object and generated based on the first information, comprises:

in response to detail information of the first object that is entered in the content generation page, displaying live-streaming textual content that is for the first object and generated based on the detail information; or in response to identification information of the first object that is entered in the content generation page, displaying the detail information of the first object, and in response to a content generation operation on the content generation page, displaying the live-streaming textual content that is for the first object and generated based on the detail information.

13. The non-transitory computer-readable medium according to claim 12, wherein the first object is a commodity object, the detail information comprises at least one of a commodity image, a commodity name, and commodity attributes of the commodity object, and the identification information comprises at least one of a commodity number or a commodity link of the commodity object.

14. The non-transitory computer-readable medium according to claim 11, wherein the first object comprises a commodity object, the displaying, in response to first information of a first object that is entered in the content generation page, live-streaming textual content that is for the first object and generated based on the first information, comprises:

in response to commodity information of the commodity object and sales rule information for the commodity object that are entered in the content generation page, displaying live-streaming textual content that is for the commodity object and generated based on the commodity information and the sales rule information.

15. The non-transitory computer-readable medium according to claim 11, wherein the displaying, in response to first information of a first object that is entered in the content generation page, live-streaming textual content that is for the first object and generated based on the first information, comprises:

in response to first information of a plurality of first objects that is entered in the content generation page, displaying live-streaming textual content that is for the plurality of first objects and generated based on the first information of the plurality of first objects, wherein the live-streaming textual content comprises live-streaming textual content of each first object and linking textual content between two adjacent first objects.

16. The non-transitory computer-readable medium according to claim 11, wherein the displaying, in response to first information of a first object that is entered in the content generation page, live-streaming textual content that is for the first object and generated based on the first information, comprises:

in response to the first information of the first object that is entered in the content generation page, displaying first live-streaming textual content that is for the first object and generated based on the first information; and in response to a trigger operation on a regeneration control in the content generation page, displaying second live-streaming textual content that is for the first object and regenerated based on the first information, wherein the second live-streaming textual content and the first live-streaming textual content differ in at least one of content structure or expression.

17. The non-transitory computer-readable medium according to claim 11, further comprising:

in response to an edit operation on the live-streaming textual content that is triggered in the content generation page, switching the live-streaming textual content displayed in the content generation page from a display mode to an edit mode; and in response to a modification operation on the live-streaming textual content in the edit mode, determining modified textual content corresponding to the modification operation, and in response to a save operation on the modified textual content, displaying the modified textual content on the content generation page by using the display mode.

18. The non-transitory computer-readable medium according to claim 11, further comprising:

when the live-streaming textual content is displayed, marking and prompting first content that does not satisfy a preset rule in the live-streaming textual content.

19. An electronic device, comprising:

at least one memory, configured to store a computer program; and at least one processor, configured to execute the computer program in the at least one memory to implement a content generation method, wherein the content generation method comprises:

displaying a content generation page, wherein the content generation page is configured to generate textual content required for live-streaming; and displaying, in response to first information of a first object that is entered in the content generation page, live-streaming textual content that is for the first object and generated based on the first information, wherein the live-streaming textual content is configured to introduce the first object in a live-streaming manner;

wherein the method further comprises:

displaying content structure information when the live-streaming textual content is displayed, wherein the content structure information represents a content composition structure of the live-streaming textual content, the content structure information comprises at least one piece of structure information, each structure information has corresponding textual content, the live-streaming textual content comprises textual content corresponding to the at least one piece of structure information; and in response to a trigger operation on first structure information in the content structure information, marking, in the live-streaming textual content, first textual content corresponding to the first structure information.

* * * * *